US010061855B2

(12) United States Patent
Waibel et al.

(10) Patent No.: US 10,061,855 B2
(45) Date of Patent: Aug. 28, 2018

(54) USER-SPECIFIC PRONUNCIATIONS IN A SOCIAL NETWORKING SYSTEM

(71) Applicant: Facebook, Inc., Menlo Park, CA (US)

(72) Inventors: Alexander Waibel, Murrysville, PA (US); Christian Fuegen, Saratoga, CA (US); Thilo Wolfgang Koehler, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 432 days.

(21) Appl. No.: 14/588,298

(22) Filed: Dec. 31, 2014

(65) Prior Publication Data

US 2016/0188727 A1    Jun. 30, 2016

(51) Int. Cl.
| G06F 17/30 | (2006.01) |
| H04L 29/08 | (2006.01) |
| G09B 7/00 | (2006.01) |
| G09B 5/06 | (2006.01) |
| G09B 19/04 | (2006.01) |

(52) U.S. Cl.
CPC .. G06F 17/30867 (2013.01); G06F 17/30528 (2013.01); G09B 5/06 (2013.01); G09B 7/00 (2013.01); G09B 19/04 (2013.01); H04L 67/306 (2013.01)

(58) Field of Classification Search
USPC .................................................. 707/734, 758
See application file for complete search history.

(56) References Cited

U.S. PATENT DOCUMENTS

| 8,635,217 B2* | 1/2014 | Markus ............. G06F 17/30864 707/734 |
| 8,682,917 B2* | 3/2014 | Eskin ................ G06F 17/30964 707/758 |
| 8,727,885 B2* | 5/2014 | Berger ................... A63F 13/12 273/243 |
| 8,751,621 B2* | 6/2014 | Vaynblat ................ G06Q 50/01 709/223 |
| 8,788,479 B2* | 7/2014 | Manuel-Devadoss ...................... G06F 17/30867 706/12 |
| 8,805,845 B1* | 8/2014 | Li ..................... G06F 17/30958 707/738 |
| 8,880,521 B2* | 11/2014 | Markus .................. G06Q 10/10 707/734 |
| 8,909,646 B1* | 12/2014 | Fabrikant ............... G06Q 50/01 707/737 |
| 9,245,018 B2* | 1/2016 | Mack ..................... G09B 19/04 |
| 9,275,633 B2* | 3/2016 | Cath ....................... G10L 13/08 |
| 2009/0198487 A1 | 8/2009 | Wong et al. |
| 2013/0332143 A1 | 12/2013 | Leszczenski et al. |

* cited by examiner

*Primary Examiner* — Kim Nguyen
(74) *Attorney, Agent, or Firm* — Fenwick & West LLP

(57) ABSTRACT

A social networking system obtains user pronunciations of terms whose pronunciations might vary among different users, such as names of users. The social networking system additionally obtains demographic information about the users from whom the pronunciations were obtained, as well as social graph information for those users, such as information about connections of those users in the social graph. Based on the obtained pronunciations, the demographic information, and the social graph information, the social networking system determines, for a user having that name (or other term in question), one or more suggested pronunciations for the name that are likely to be the pronunciations that that user would use.

19 Claims, 7 Drawing Sheets

USER-SPECIFIC PRONUNCIATIONS IN A SOCIAL NETWORKING SYSTEM

BACKGROUND

The present invention generally relates to the field of electronic social networking systems, and more particularly, to ways of obtaining and providing appropriate user-specific pronunciations of names or other words of text within a social networking system.

Social networking systems, such as FACEBOOK, may have large user bases representing many countries, languages, and cultures. Accordingly, different users may have different pronunciations for their own names or for other words or phrases (e.g., the name of their country). Thus, relying on a single global pronunciation fails to provide an optimal, customized user experience across the diverse users of the social networking system.

SUMMARY

A social networking system obtains user pronunciations of words or phrases whose pronunciations might vary among different users, such as names of users. The social networking system additionally obtains demographic information about the users from whom the pronunciations were obtained, as well as social graph information for those users, such as information about connections of those users in the social graph. Based on the obtained pronunciations, the demographic information, and the social graph information, the social networking system determines, for a user having that name (or other word/phrase in question), one or more suggested pronunciations for the name that are likely to be the pronunciations that that user would use.

The user can confirm one of the suggested pronunciations as being the correct pronunciation of the name for that user, or the user can modify one of the suggested pronunciations, or the user can provide a different pronunciation (e.g., through a phonetic spelling, or through audio input). In any case, these pronunciations are then considered confirmed pronunciations for that user, and may be used as input for determining the proper pronunciations of the name for other users.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
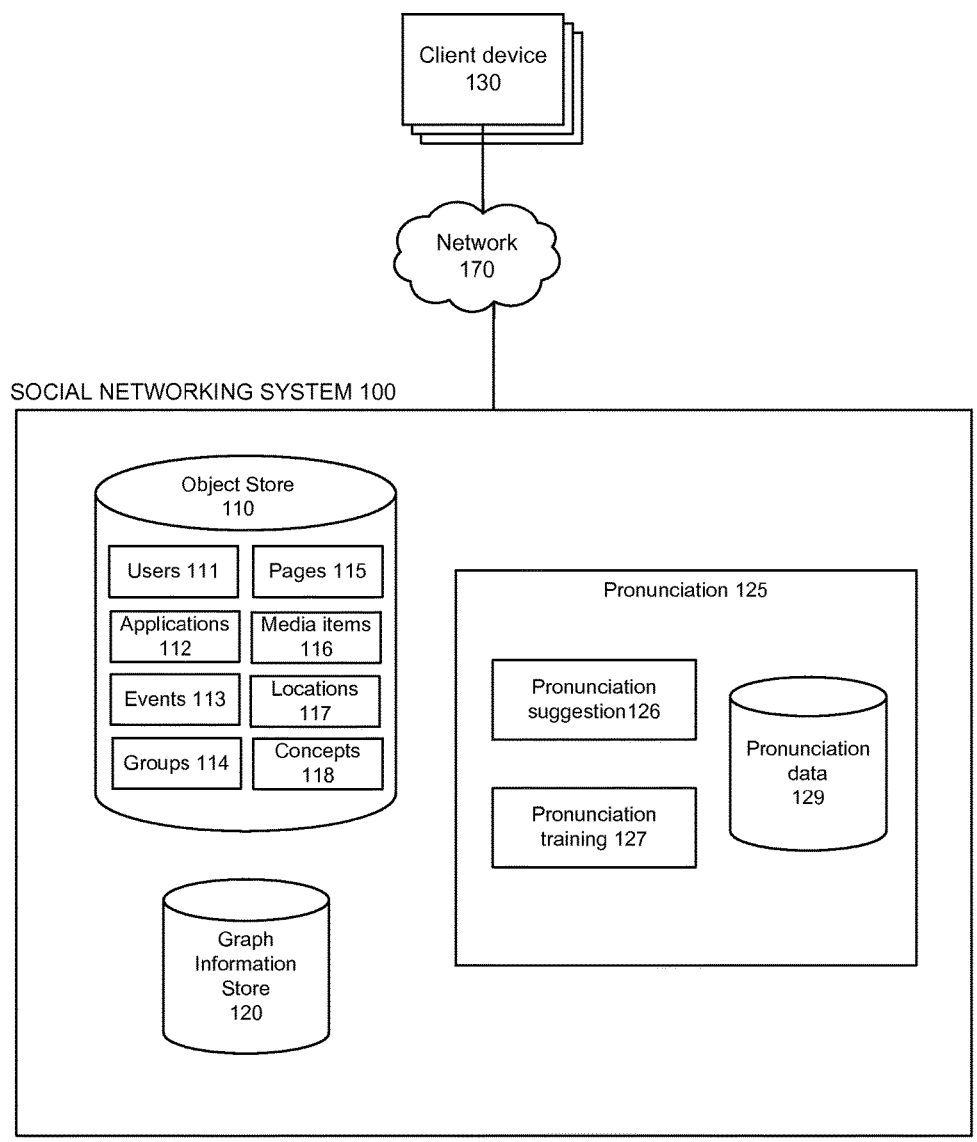
FIG. 1 is a high-level block diagram of a computing environment, according to one embodiment.

FIG. 1 is a high-level block diagram of a computing environment according to one embodiment. FIG. 1 illustrates a social networking system 100 and client devices 130 connected by a network 170. A user of the client device 130 interacts with the social networking system 100 via an application such as a web browser or an application specifically authored to interface with the social networking system, performing operations such as browsing content, posting messages, performing queries for people or other content of interest, and the like.

The social networking system 100 comprises an object store 110 that stores information on various objects tracked by the social networking system 100. These objects may represent a variety of things with which a user may interact in the social networking system 100. For example, the objects may include the user or other users 111 of the social networking system, represented, e.g., as a profile object for the user. The profile includes information about the user, whether expressly stated by the user, or inferred by the social networking system 100 (e.g., based on the user's actions on the social networking system). Information about the user included in the user profile may include, among other information, demographic information including: age, income level, a current or prior location of residence of the user (e.g., a city, state, or country), a list of languages spoken by the user (e.g., English, Spanish, and Chinese), and a (highest) level of education attained by the user (e.g., high school, undergraduate, or graduate degrees).

The objects may also include, without limitation, applications 112 (e.g., a game playable within the social networking system), events 113 (e.g., a concert that users may attend), groups 114 to which users may belong (e.g., a group devoted to alternative energy research), pages 115 (e.g., pages constituting a particular person or organization's presence on the system, such as pages about particular celebrities, car models, or TV shows), items of media content 116 (e.g., pictures, videos, audio, text, or any other type of media content), locations 117 associated with a user (e.g., "San Jose, Calif., USA"), and concepts 118 or other terms (e.g., an object corresponding to the concept "alternative energy"). An object in the object store 110 may represent an entity existing within the social networking system (e.g., an application 112 available on the social networking system), a virtual entity that exists outside the domain of the social networking system (e.g., a website), or a real-world entity (e.g., a person, a product, or a show). User objects 111 may represent an individual human person, but also may represent other entities, such as fictitious persons or concepts.

The object store 110 may store text items 119A, which are objects having textual portions. For example, the text items 119A include postings submitted by users 111, such as status update messages, inbox messages, comments, notes, postings, or the like. Other objects described above may also be considered text items 119A, such as pages 115 and media items 116, assuming that they contain text.

The object store 110 may store all of the objects existing within the social networking system 100, such as the code of an application 112, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "L. James" for a person or page 115, or "Green Energy Group"

for a group 114), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Al" and "Gore") for a user object 111.

In one embodiment the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects 111 representing that the users have a relationship in the social networking system (e.g., are friends, or have communicated, viewed the other's profile, expressed a request to see ("follow") the comments/actions of the other user is, or generally interacted in some way), an edge between a user object 111 and an application object 112 representing that the user has used the application, and an edge between a user object 111 and a group object 114 representing that the user belongs to the group, and an edge between a user object 111 and a page object 115 representing that the user has viewed the page, expressly specified an affinity for the page (e.g., "Liked" the page), or requested to "follow" the page. A user 111 is considered a direct connection of another user in the social networking system 100 if there is an edge between the two users in the social graph, as opposed, for example, to there only being a series of edges that indirectly connect the users.

For example, if one user 111 establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. In a still further example, if a first user follows a second user, the social networking system 100 is notified of this fact, a unidirectional "following" edge may be created between from the first user to the second user within the graph information store 120. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" or "following" as the label between two user objects), and/or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

The "social graph information" for a particular user includes the information directly available from the social graph, such as identities of the user's connections and the types and relationships of those connections with the user. The "social graph information" for a user also includes information about the connections themselves, such as user profile information for the user's connections (e.g., the languages spoken by the connections).

Different users of the social networking system 100 may have different pronunciations for words or phrases—such as their own names, names of their countries, or other words—that are influenced by a number of different factors, such as the language spoken by the user, the user's region(s) of residence or of birth, the user's culture or education, and the like. (A word or phrase is hereinafter collectively referred to as a "term.") For example, different users might variously pronounce the name "Michael" as "my-kul", "mick-ale", or "mick-ay-ull"; similarly, users from Argentina and the United States might typically pronounce the country name "Argentina" as "ar-hen-tee-na" and "ar-jin-tee-na", respectively. Thus, a global pronunciation model that used the same pronunciation for a name (or other term) for all users would in many cases fail to reflect the preferred and/or expected pronunciation for the given user. Accordingly, the social networking system 100 further comprises a pronunciation module 125 that handles details related to the user-specific pronunciation of a name or other textual term, such as obtaining specified pronunciations from users. An example of the operations of the pronunciation module 125 is now provided with respect to FIGS. 2A-2D. Moreover, the received input need not be exactly the same name or textual word (e.g., different spellings or typographical errors in the name Michael may be accepted.)

FIGS. 2A-2D illustrate user interfaces of the social networking system 100 in conjunction with which the pronunciation module 125 is used to specify and to obtain pronunciations of the name of a user, according to one embodiment.

Figure 2A:
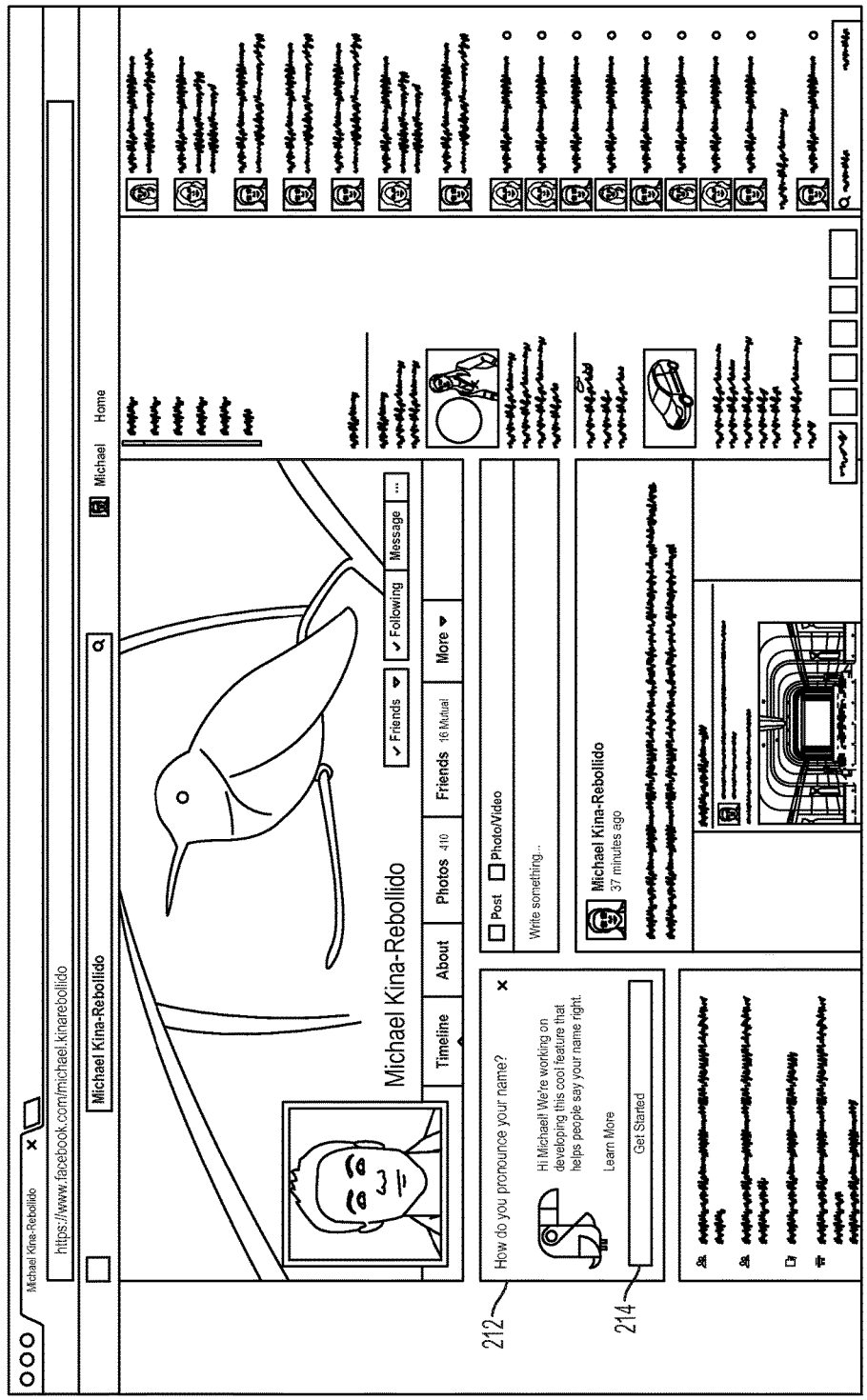
FIGS. 2A-2D illustrate user interfaces in conjunction with which a pronunciation module is used to specify and to obtain pronunciations of the name of a user, according to one embodiment.

FIG. 2A illustrates a page for a particular first user of the social networking system (namely, a user with the name "Michael Kina-Rebollido"). Region 212 of the user interface prompts that user to specify a pronunciation for his name, and selection of the user interface element 214 begins the process of specifying the pronunciation, leading to FIG. 2B.

Figure 2B:
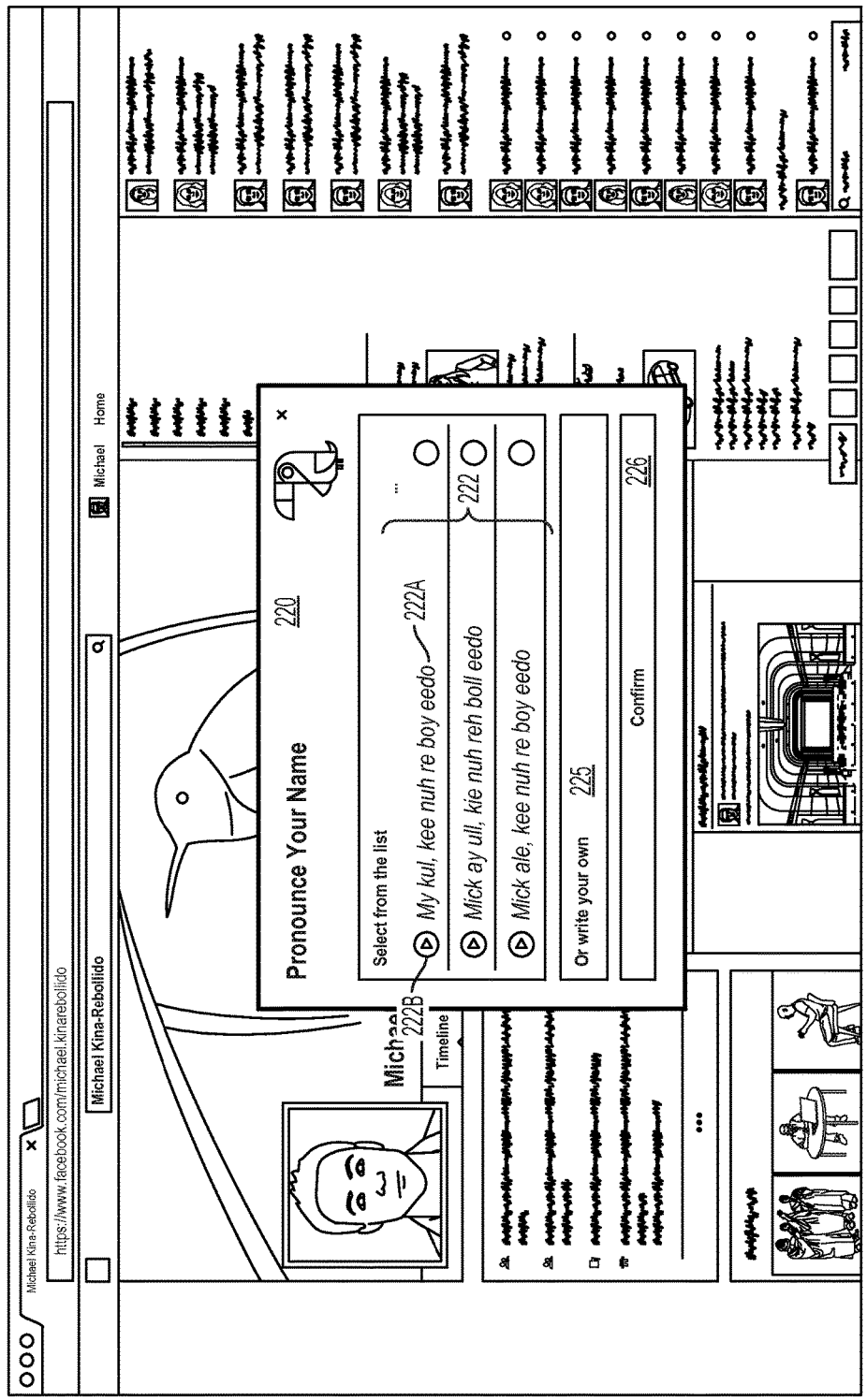

FIG. 2B illustrates a user interface region 220 for specifying the pronunciation of a name. Specifically, the user interface region 220 includes a set of different pronunciation suggestions 222. Each suggestion 222 includes a phonetic textual expression 222A and an audio element 222B. The phonetic textual expression 222A is text that expresses, using intuitive phonetic units for each syllable, how the name should be pronounced. For example, the pronunciation module 125 suggests that the name "Michael Kina-Rebollido" could be pronounced "my kul, kee nuh re boy eedo", or "mick ay ull, kie nuh reh boll eedo", or "mick ale, kee nuh re boy eedo". The user can also activate (e.g., click on) the audio control 222B corresponding to a particular phonetic textual expression 222A to cause the pronunciation module 125 to produce audio output for the phonetic textual expression, in case the user is uncertain about how the phonetic textual expression should be pronounced. If one of the pronunciation suggestions 222 is indeed how the user pronounces his name, then the user can confirm that that suggestion 222 is correct for that user by selecting the suggestion and then selecting the confirmation user interface element 226. Alternatively, if the user believes that none of the pronunciation suggestions 222 is accurate, then the user can select the element 225 and specify the pronunciation of his name using the user interface of FIG. 2C.

Figure 2C:
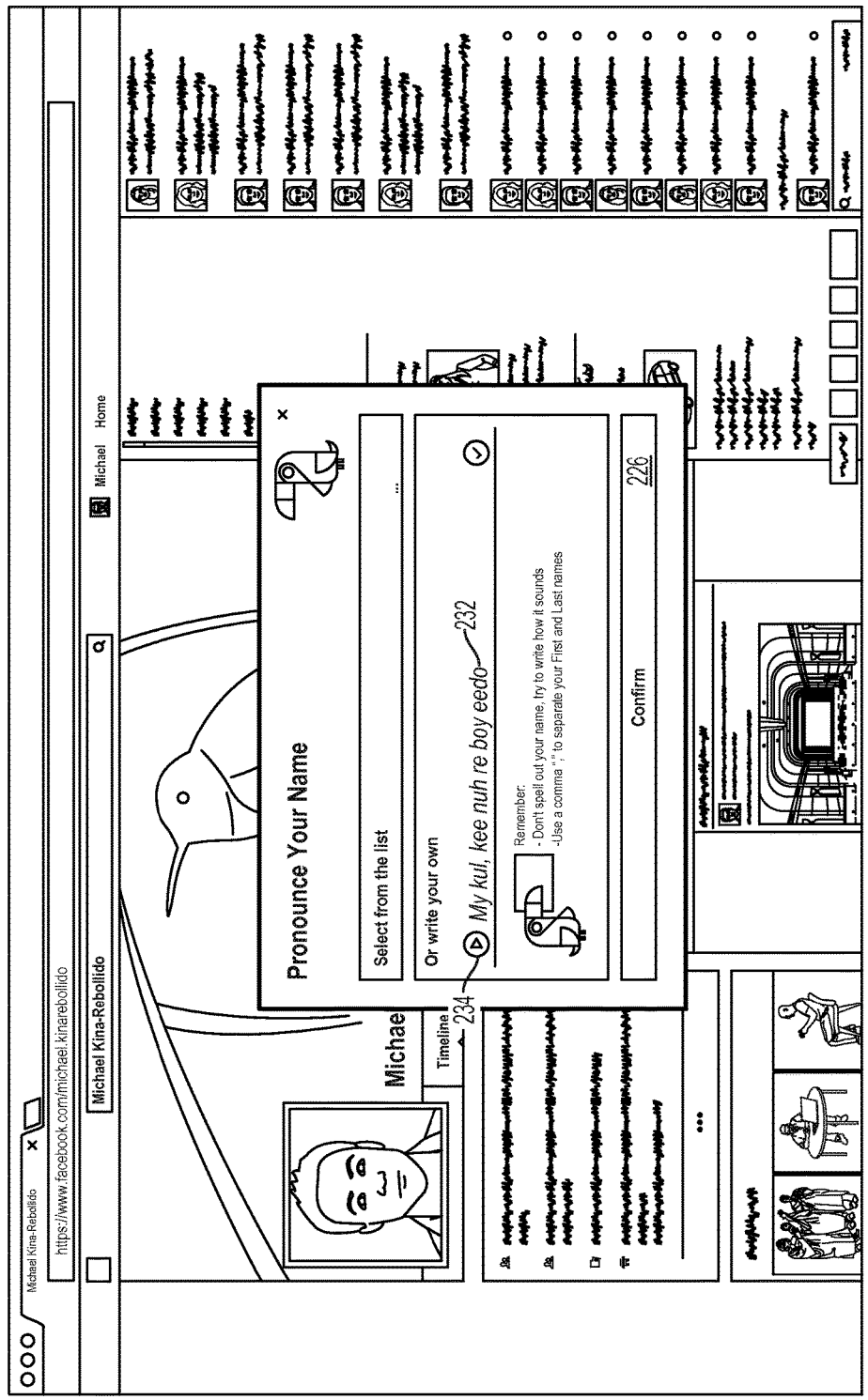

In the example of FIG. 2C, the user has specified the phonetic textual representation 232 "my kul, keen uh re boy eedo", using a comma to separate his first and his last name. The user can then select the audio control 234 to cause the pronunciation module 125 to produce an audio version of the phonetic textual representation 232. In one embodiment (not depicted), the user interface also includes a microphone input control that when selected allows the user to specify the pronunciation of his name by speaking the name, which the pronunciation module 125 may convert and store internally as a phonetic representation. Once the user has specified the pronunciation of his name to his satisfaction, he uses the confirmation user interface element 226 to complete the process, at which point the pronunciation module 125 stores that pronunciation in association with the name of that particular user.

In one embodiment, the user can also modify one of the provided suggestions by modifying an individual phonetic unit. For example, in one embodiment the user can modify a phonetic unit in the user interface of FIG. 2B, such as by clicking on or otherwise designating a phonetic unit and typing a new phonetic spelling for it, or by clicking on it and selecting a different phonetic unit from a drop-down selection list of possible phonetic units, and suggested pronunciation is revised accordingly.

A pronunciation of the user's name is deemed to be a "confirmed pronunciation" if the user performed some action indicating approval of the pronunciation. The approval action could be, for example, the user selecting and expressly approving one of the suggested pronunciations presented to the user (e.g., a selection from the suggestions 222 of FIG. 2B), or the user manually formulating the pronunciation (e.g., as shown in FIG. 2C), or the user modifying one or more phonetic units of the an original suggested pronunciation and approving the result, or the like.

Figure 2D:
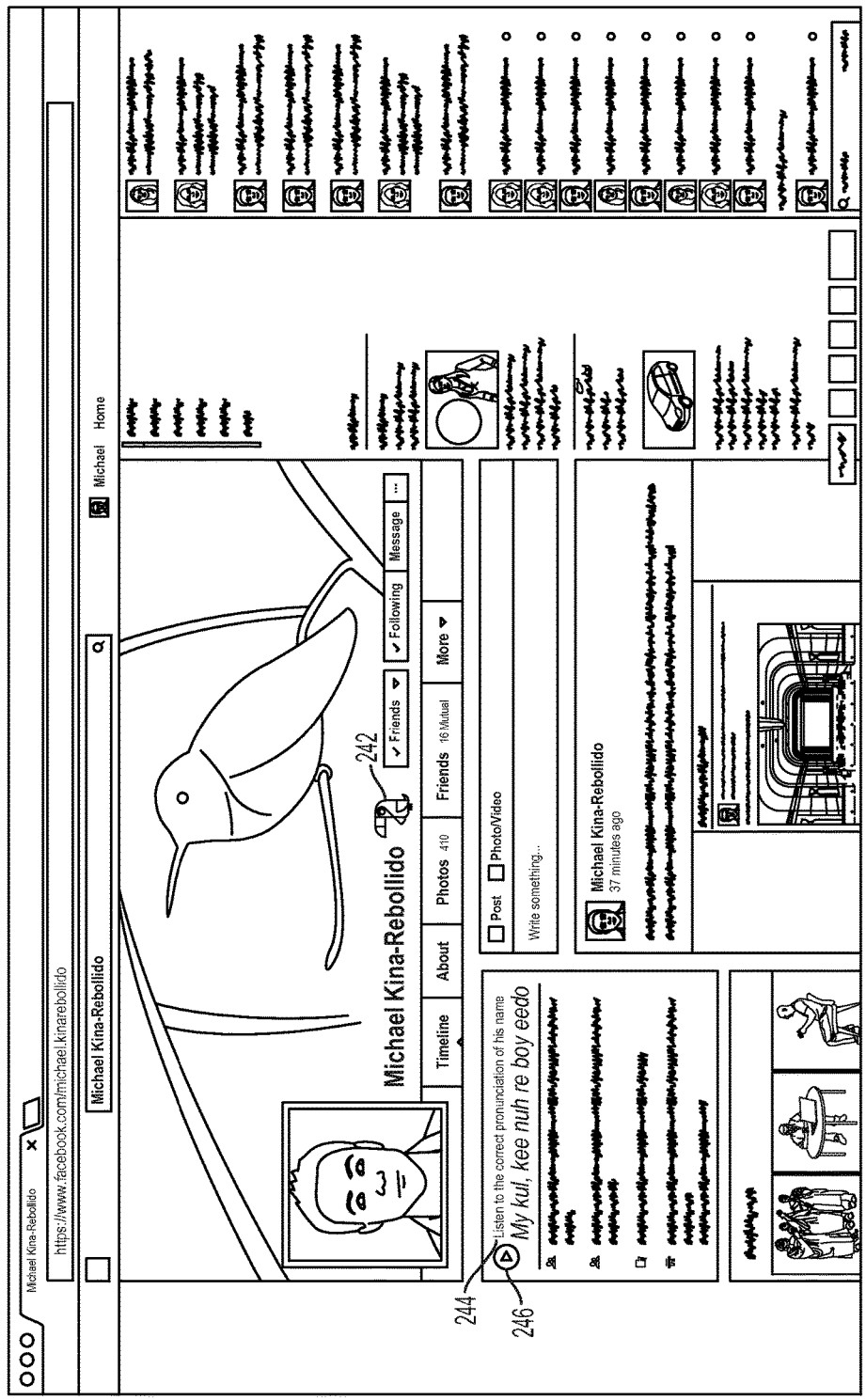

FIG. 2D illustrates a user interface generated by the social networking system 100 for a second, different user, and which allows the second user to learn the proper pronunciation of the name of the first user. Specifically, the user interface includes user interface elements 242 and 246, clicking either of which causes the pronunciation module 125 to provide an audio version of the pronunciation. Additionally, the text region 244 displays the specified pronunciation, illustrated as a phonetic spelling ("My kul, kee nuh re boy eedo"). Thus, for example, if the second user were not already very familiar with the first user, the second user could use the pronunciation-oriented elements 242, 244, 246 to learn the proper pronunciation of the first user's name.

It is appreciated that the process illustrated in FIGS. 2A-2D could be similarly applied to obtaining and providing user-specific pronunciations for term other than personal names. For example, the user interface 212, 214 of FIG. 2A could instead solicit the user's pronunciation of something else related to the user, such as the name of the user's university or the user's place of residence, or the names of the user's friends.

Referring again to FIG. 1, the pronunciation module 125 comprises a pronunciation suggestion module 126 that determines one or more suggested user-specific pronunciations for a given name (or other term) of a given user, such as the three suggestions 222 of FIG. 2B. The pronunciation suggestion module 126 determines the pronunciations to suggest based on information of the social networking system 100 that is associated with the given user. The information on which the suggestions are based may include demographic information stored in a user profile for the given user, and it may alternatively and/or additionally be based on social graph information providing information the connections of the user to other users (or other objects), as specified in the graph information store 120, and about the users (or other objects) to which the user is connected.

In another embodiment, the pronunciation suggestion module 126 provides suggestions on an individual word (e.g., first names decoupled from last names) or on an individual phonetic unit level (e.g., individual syllables that are selectable by a user). For example, the user interface illustrated in FIG. 2B may provide suggestions, such as elements 222, but by word or by syllable. Once a user selects one form a list of suggested words or syllables, the interface provides a set of suggestions for the next word or syllable. This next set of suggestions may be determined based on the selected word or syllable. In one example, where individual syllables are suggested, the first and last names are decoupled. This provides many more options of first name guesses and last name guesses. Next, the words are divided into syllables, and a pronunciation is composed out of selection of syllables. For example, in a long name, each suggestion will have different wrong syllable, which allows for decoupling the syllables (i.e., a user can pick one syllable at a time), and then the system can provide not just name pronunciations but also a graph that makes all combinations possible. In one example, for each syllable, the system could suggest the top N suggestions (e.g., 3), which can be determined based on a graph and the user's previous selections to traverse the graph. The actual scoring and ranking of a single syllable can use the same technique as the scoring and ranking for words.

In one embodiment, the demographic, user profile-based information for the given user that is taken into account when formulating pronunciation recommendations includes (in addition to the user's name itself), the user's location (either of current residence or of birth, for example), such as a country, state, and/or city; the language(s) that the user speaks; the user's education level; and/or the user's income level.

In one embodiment, the graph information store 120 information that is taken into account includes the languages spoken by certain close connections of the given user (e.g., the user's parents). In this embodiment, the particular set of close connections (e.g., parents) of the user is identified using the graph information store 120, and the languages spoken by those connections is determined. The graph information store 120 information may also include the pronunciations of names of other connections of the given user, as specified by the given user. For example, the user's pronunciations of names (or other terms) as a whole, or of individual syllables, can be used to produce suggestions of how the user would pronounce his or her own name (or other terms). The pronunciations of the user's connections (if any) of the user's name can also be used to produce suggestions of the user would pronounce his name, particularly when the user's connections speak the same language, and/or are from the same or similar geographic region.

In one embodiment, the pronunciation suggestion module 126 uses predetermined rules to determine which particular pronunciations to suggest for a given name (or other term). For example, the rules could be implemented as a series of logical expressions evaluated by the pronunciation suggestion module 126. One (informal) example of such rules could be "if the user's connection having the strongest affinity with the user has provided a pronunciation for the user's name, use the provided pronunciation as suggestions; else, if there are 3 or more pronunciations of the user's name by connections of the user that share the user's primary language, then use the 3 most frequent of those pronunciations as suggestions; else, if there are 3 or more pronunciations of the user's name by any user that shares the user's primary language, then use the 3 most frequent of those pronunciations as suggestions; else, use the most frequent pronunciation, regardless of the language of the user submitting the pronunciation."

In another embodiment, the pronunciation module 125 further comprises a pronunciation training module 127 that the pronunciation suggestion module 126 uses to formulate suggestions. The pronunciation training module 127 uses, as ground truth, the pronunciations of users who have specified pronunciations for their own names, and based on these known pronunciations accordingly learns how to pronounce arbitrary names. Specifically, the pronunciation training module 127 takes, as input, the known pronunciations and, as corresponding training features, the values of a set of attributes previously determined to have an influence on pronunciation. For example, in different embodiments, the features include different ones of the user profile and graph information store 120 information mentioned above, such as the country of residence of the user submitting the pronunciation, the primary languages of the user's first-level connections, or the like. Based on this input, the pronunciation training module 127 trains a pronunciation model that, for a given user's name (and for that user's name, values for the same features that were used to train the pronunciation model), predicts a pronunciation that the user would be most likely to use.

Figure 3:
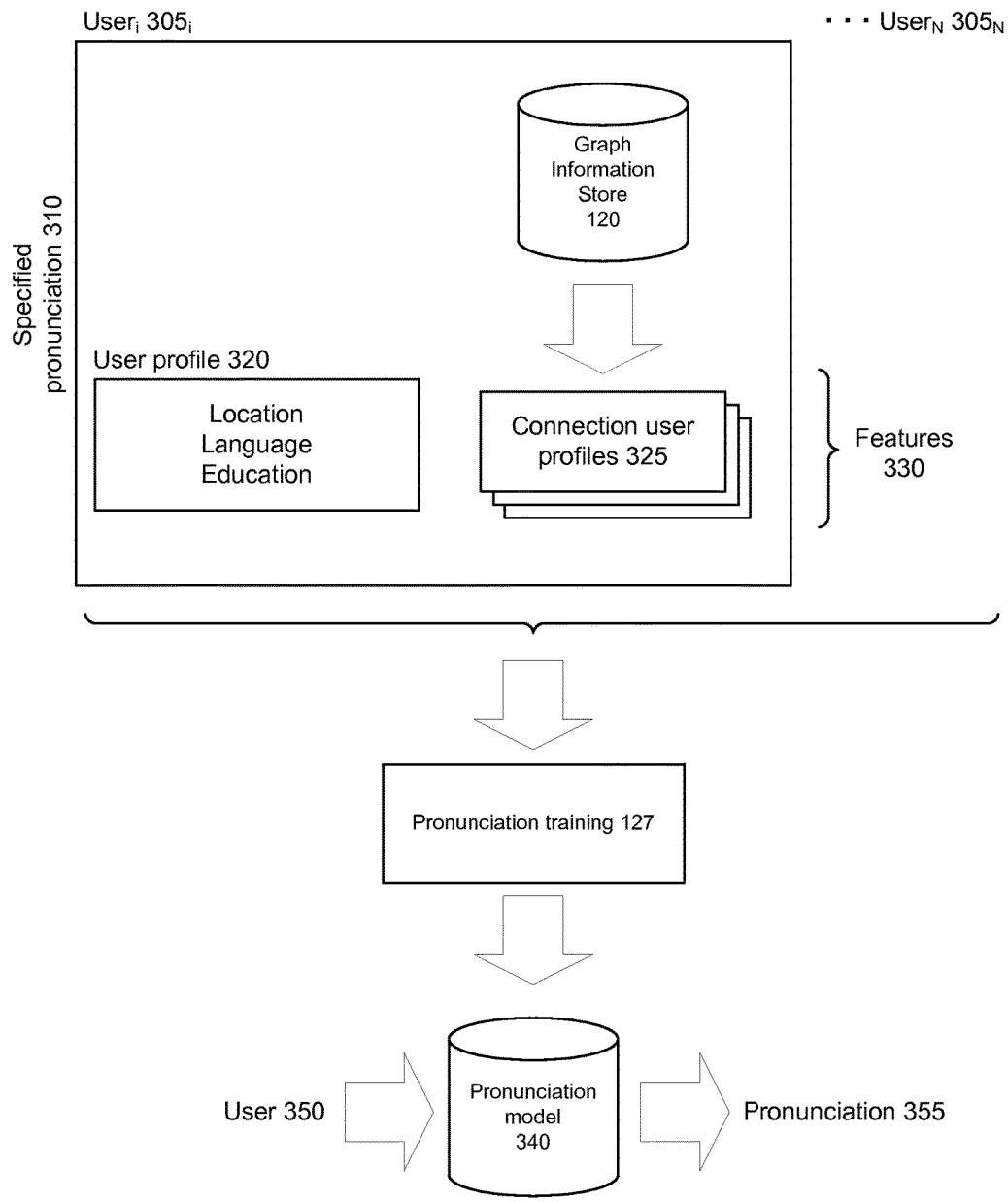
FIG. 3 is a data flow diagram illustrating training performed by a pronunciation training module, according to one embodiment.

FIG. 3 is a data flow diagram illustrating the training performed by the pronunciation training module 127, according to one embodiment. A training set of users 305 who have confirmed a pronunciation 310 for their names each have a user profile 320, and a set of connections as obtained from the graph information store 120, each of whom also has a user profile 325. Data from the user profiles 320, 325 act as features 330, which along with the specified pronunciations act as input to the pronunciation training module 127, which outputs a pronunciation model 340. When a (textual) name of a user 350 is provided as input to the pronunciation model 340, the model outputs a pronunciation 355 for that name.

Process of Translation

Figure 4:
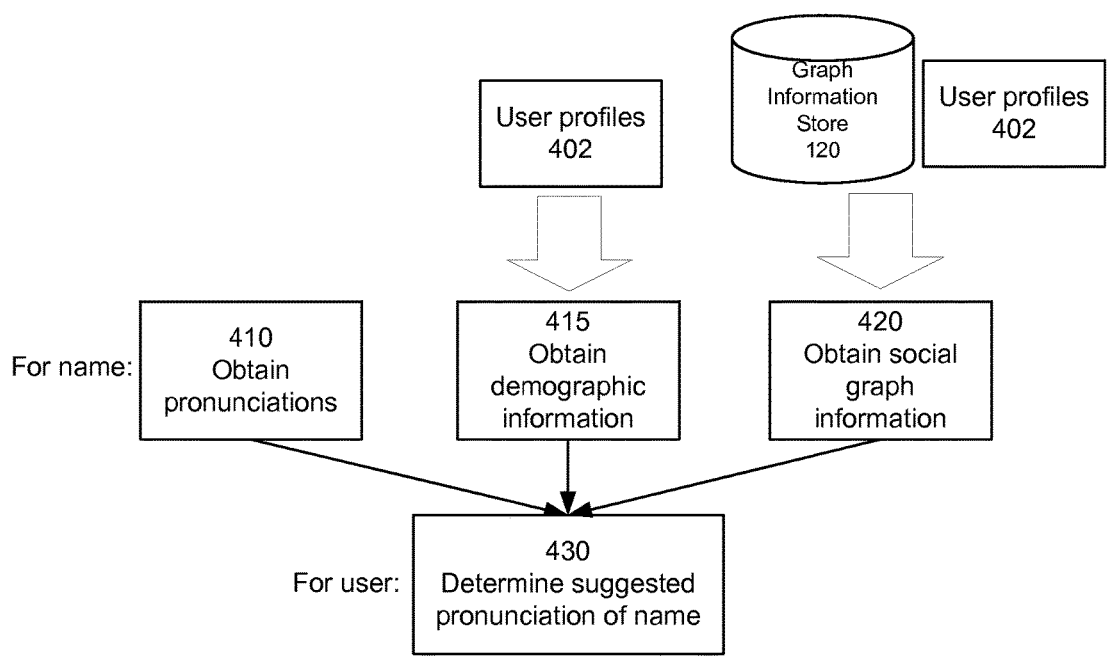
FIG. 4 is a flowchart illustrating operations performed by a pronunciation module when suggesting a pronunciation of a name (or other word/phrase) for a particular user, according to one embodiment.

FIG. 4 is a flowchart illustrating operations performed by the pronunciation module 125 when suggesting a pronunciation of a name (or other term) for a particular user, according to one embodiment.

Pronunciations are obtained 410 for the same name from a number of users. For example, the pronunciation module 125 might obtain confirmed pronunciations for that name (or for individual tokens of the name, such as first name or last name) from other users having the same name (or individual name tokens thereof). The pronunciations may be obtained in the manner described above with respect to FIGS. 2B-2C, for example. The pronunciations are then stored in the pronunciation data repository 129 of FIG. 1 in association with the name that they pronounce and the user from whom they were obtained. In one embodiment, the pronunciations are stored in a phonetic representation, e.g., using text as in the suggestions 222 of FIG. 2B, or an equivalent thereof. Alternatively and/or additionally, the pronunciations are stored as audio, either as directly input by the user (e.g., via a microphone) when specifying the pronunciation, or as produced from a confirmed phonetic representation using text to speech technology.

For each user from whom a pronunciation was obtained, the pronunciation module 125 obtains 415 demographic information about that user, and also obtains 420 social graph information related to connections of that user in the social graph, as discussed above with respect to the pronunciation suggestion module 126.

Using the obtained pronunciations, demographic information, and social graph information, the pronunciation module 125 can determine 430 a suggested pronunciation for the name for a user who has not yet specified a pronunciation of the name. For example, referring again to FIG. 2B, the pronunciation module 125 could determine that a user named "Michael Kina-Rebollido" has not yet confirmed a pronunciation for his name. Accordingly, the pronunciation module 125 could determine 430, based on the pronunciations, demographic information, and social graph information obtained from other users with the same name (or with identical or similar individual name tokens, or merely with similar phonetic units in their names), suggested pronunciations for the name, such as the suggested pronunciations 222 depicted in FIG. 2B.

Once a user has confirmed a pronunciation of his name (or of some other term), the pronunciation module 125 can provide a representation of that pronunciation to other users. Referring again to FIG. 2D, for example, the pronunciation module 125 provides a textual phonetic representation of the name in region 244, and also provides an audio representation of the pronunciation in response to selection of user interface elements 242, 246.

Other Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by a social networking system, the method comprising:
   obtaining, for a name, from each user of a plurality of users having the name in a profile of the user in the social networking system:
      a pronunciation of the name by the user,
      demographic information of the user, and
      social graph information of the user, the social graph information of the user comprising information about one or more other users of the social networking system to whom the user has formed a connection and information about a type and strength of connection between the user and the one or more other users; and
   for a first user having the name, determining a suggested pronunciation of the name using the pronunciations, the demographic information, and the social graph information.

2. The computer-implemented method of claim 1, wherein the first user has not yet specified a pronunciation of the name.

3. The computer-implemented method of claim 1, further comprising:
   providing the suggested pronunciation to the first user;
   receiving from the first user a confirmation of the suggested pronunciation; and
   storing the suggested pronunciation as a confirmed pronunciation of the name.

4. The computer-implemented method of claim 2, further comprising:
   providing a representation of the confirmed pronunciation to a second user different from the first user, the representation comprising audio output corresponding to the confirmed pronunciation.

5. The computer-implemented method of claim 2, further comprising:
   providing a representation of the confirmed pronunciation to a second user different from the first user, the representation comprising a phonetic textual representation that includes a number of phonetic units.

6. The computer-implemented method of claim 1, further comprising:
   determining, for a second user different from the first user, an alternate pronunciation different from the confirmed pronunciation, based on demographic information of the second user; and
   providing a representation of the alternate pronunciation to the second user.

7. The computer-implemented method of claim 1, further comprising:
   providing a representation of the suggested pronunciation to the first user, the representation comprising a phonetic textual representation that includes a number of phonetic units;
   receiving a modification by the first user to one of the phonetic units;
   revising the suggested pronunciation using the modified phonetic unit; and
   storing the revised suggested pronunciation as a confirmed pronunciation of the name of the first user.

8. The computer-implemented method of claim 1, wherein the demographic information of the users comprises at least one of: countries of residence of the users, countries of origin of the users, and languages spoken by the users.

9. The computer-implemented method of claim 1, further comprising identifying, for the users using the social graph information, connections of the users, wherein the social graph information of the users comprises languages spoken by the connections of the users.

10. The computer-implemented method of claim 8, further comprising identifying, for the users using the social graph information, parents of the users, wherein the social graph information of the users comprises languages spoken by the parents of the users.

11. A computer-readable storage medium comprising instructions executable by a processor, the instructions comprising:
   instructions for obtaining, for a name, from each user of a plurality of users having the name in a profile of the user in the social networking system:
      a pronunciation of the name by the user,
      demographic information of the user, and
      social graph information of the user, the social graph information of the user comprising information about one or more other users of the social networking system to whom the user has formed a connection and information about a type and strength of connection between the user and the one or more other users; and
   instructions for, for a first user having the name, determining a suggested pronunciation of the name using the pronunciations, the demographic information, and the social graph information.

12. The computer-readable storage medium of claim 11, wherein the first user has not yet specified a pronunciation of the name.

13. The computer-readable storage medium of claim 11, the instructions further comprising:

instructions for providing the suggested pronunciation to the first user;

instructions for receiving from the first user a confirmation of the suggested pronunciation; and instructions for storing the suggested pronunciation as a confirmed pronunciation of the name.

14. The computer-readable storage medium of claim 12, the instructions further comprising:

instructions for providing a representation of the confirmed pronunciation to a second user different from the first user, the representation comprising audio output corresponding to the confirmed pronunciation.

15. The computer-readable storage medium of claim 12, the instructions further comprising:

instructions for providing a representation of the confirmed pronunciation to a second user different from the first user, the representation comprising a phonetic textual representation that includes a number of phonetic units.

16. The computer-readable storage medium of claim 11, the instructions further comprising:

instructions for determining, for a second user different from the first user, an alternate pronunciation different from the confirmed pronunciation, based on demographic information of the second user; and instructions for providing a representation of the alternate pronunciation to the second user.

17. The computer-readable storage medium of claim 11, the instructions further comprising:

instructions for providing a representation of the suggested pronunciation to the first user, the representation comprising a phonetic textual representation that includes a number of phonetic units;

instructions for receiving a modification by the first user to one of the phonetic units;

instructions for revising the suggested pronunciation using the modified phonetic unit; and instructions for storing the revised suggested pronunciation as a confirmed pronunciation of the name of the first user.

18. The computer-readable storage medium of claim 11, wherein the demographic information of the users comprises at least one of: countries of residence of the users, countries of origin of the users, and languages spoken by the users.

19. The computer-readable storage medium of claim 11, the instructions further comprising instructions for identifying, for the users using the social graph information, connections of the users, wherein the social graph information of the users comprises languages spoken by the connections of the users.

* * * * *